US011805514B2

United States Patent
Abotabl et al.

(10) Patent No.: US 11,805,514 B2
(45) Date of Patent: Oct. 31, 2023

(54) AUTONOMOUS UPLINK CANCELLATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 17/369,578

(22) Filed: Jul. 7, 2021

(65) Prior Publication Data

US 2022/0053527 A1     Feb. 17, 2022

Related U.S. Application Data

(60) Provisional application No. 63/065,889, filed on Aug. 14, 2020.

(51) Int. Cl.
*H04W 72/1268*     (2023.01)

(52) U.S. Cl.
CPC .............................. *H04W 72/1268* (2013.01)

(58) Field of Classification Search
None
See application file for complete search history.

(56) References Cited

U.S. PATENT DOCUMENTS

| 9,014,110 B2 | 4/2015 | Montojo et al. |
| 11,218,993 B2 * | 1/2022 | Huang ................ H04W 72/20 |
| 2015/0003354 A1 * | 1/2015 | Uchino ............... H04W 56/002 |
| | | 370/329 |

(Continued)

FOREIGN PATENT DOCUMENTS

| JP | 2004343578 A | * 12/2004 |
| WO | 2013012913 | 1/2013 |
| WO | WO-2021228140 A1 | * 11/2021 |

OTHER PUBLICATIONS

International Search Report and Written Opinion—PCT/US2021/040861—ISA/EPO—dated Nov. 10, 2021.

*Primary Examiner* — Ajit Patel
*Assistant Examiner* — Liem H. Nguyen
(74) *Attorney, Agent, or Firm* — Alan Gordon

(57) ABSTRACT

Certain aspects of the present disclosure provide techniques for autonomous uplink (UL) cancellation. A method that may be performed by a user equipment (UE) includes receiving one or more configurations scheduling a communication with at least one base station (BS), wherein the one or more configurations schedule a UL transmission and a DL transmission such that the UL transmission and the DL transmission overlap in a time domain, determining whether to cancel at least a portion of the UL transmission based on one or more conditions associated with the UL transmission or the DL transmission, wherein the determination of whether to cancel at least the portion of the UL transmission is in response to the UL transmission and the DL transmission overlapping in the time domain, and performing the communication based on the determination, in accordance with aspects of the present disclosure.

32 Claims, 9 Drawing Sheets

(56) References Cited

U.S. PATENT DOCUMENTS

| | | | | |
|---|---|---|---|---|
| 2016/0330011 A1* | 11/2016 | Lee | ................. | H04W 52/10 |
| 2017/0295589 A1* | 10/2017 | Sundararajan | ............ | H04L 5/14 |
| 2021/0051660 A1* | 2/2021 | Askar | ................. | H04B 7/0848 |
| 2021/0259018 A1* | 8/2021 | Hosseini | ............... | H04L 5/0044 |
| 2022/0132530 A1* | 4/2022 | Bhamri | ................... | H04L 5/003 |
| 2022/0346118 A1* | 10/2022 | Wu | ................. | H04L 5/0044 |
| 2022/0377750 A1* | 11/2022 | Yin | .................... | H04W 72/569 |
| 2023/0006781 A1* | 1/2023 | Dong | .................. | H04L 1/1822 |
| 2023/0011296 A1* | 1/2023 | Li | ........................ | H04W 72/23 |
| 2023/0047645 A1* | 2/2023 | Gou | ................... | H04W 72/569 |

\* cited by examiner

AUTONOMOUS UPLINK CANCELLATION

CROSS-REFERENCE TO RELATED APPLICATION

This application claims benefit of and priority to U.S. Provisional Application No. 63/065,889 filed Aug. 14, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for full-duplex or flexible-duplex modes of communication.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved full-duplex (FD) and flexible-duplex operations and protection of downlink (DL) reception.

Certain aspects of the subject matter described in this disclosure can be implemented in a method for wireless communications by a user equipment (UE). The method generally includes receiving one or more configurations scheduling a communication with at least one base station (BS), wherein the one or more configurations schedule an uplink (UL) transmission and a DL transmission such that the UL transmission and the DL transmission overlap in a time domain, determining whether to cancel at least a portion of the UL transmission based on one or more conditions associated with the UL transmission or the DL transmission, wherein the determination of whether to cancel at least the portion of the UL transmission is in response to the UL transmission and the DL transmission overlapping in the time domain, and performing the communication based on the determination, in accordance with aspects of the present disclosure.

Certain aspects of the subject matter described in this disclosure can be implemented in an apparatus for wireless communications by a UE. The apparatus generally includes a memory; and one or more processors coupled to the memory, the one or more processors and the memory being configured to: receive one or more configurations scheduling a communication with at least one base station, wherein the one or more configurations schedule a UL transmission and a DL transmission such that the UL transmission and the DL transmission overlap in a time domain; determine whether to cancel at least a portion of the UL transmission based on one or more conditions associated with the UL transmission or the DL transmission, wherein the determination of whether to cancel at least the portion of the UL transmission is in response to the UL transmission and the DL transmission overlapping in the time domain; and perform the communication based on the determination.

Certain aspects of the subject matter described in this disclosure can be implemented in an apparatus for wireless communications by a UE. The apparatus generally includes means for receiving one or more configurations scheduling a communication with at least one base station, wherein the one or more configurations schedule a UL transmission and a DL transmission such that the UL transmission and the DL transmission overlap in a time domain; means for determining whether to cancel at least a portion of the UL transmission based on one or more conditions associated with the UL transmission or the DL transmission, wherein the determination of whether to cancel at least the portion of the UL transmission is in response to the UL transmission and the DL transmission overlapping in the time domain; and means for performing the communication based on the determination.

Certain aspects of the subject matter described in this disclosure can be implemented in a computer-readable medium having instructions stored thereon to cause a UE to: receive one or more configurations scheduling a communication with at least one base station, wherein the one or more configurations schedule a UL transmission and a DL transmission such that the UL transmission and the DL transmission overlap in a time domain; determine whether to cancel at least a portion of the UL transmission based on one or more conditions associated with the UL transmission or the DL transmission, wherein the determination of whether to cancel at least the portion of the UL transmission is in response to the UL transmission and the DL transmission overlapping in the time domain; and perform the communication based on the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
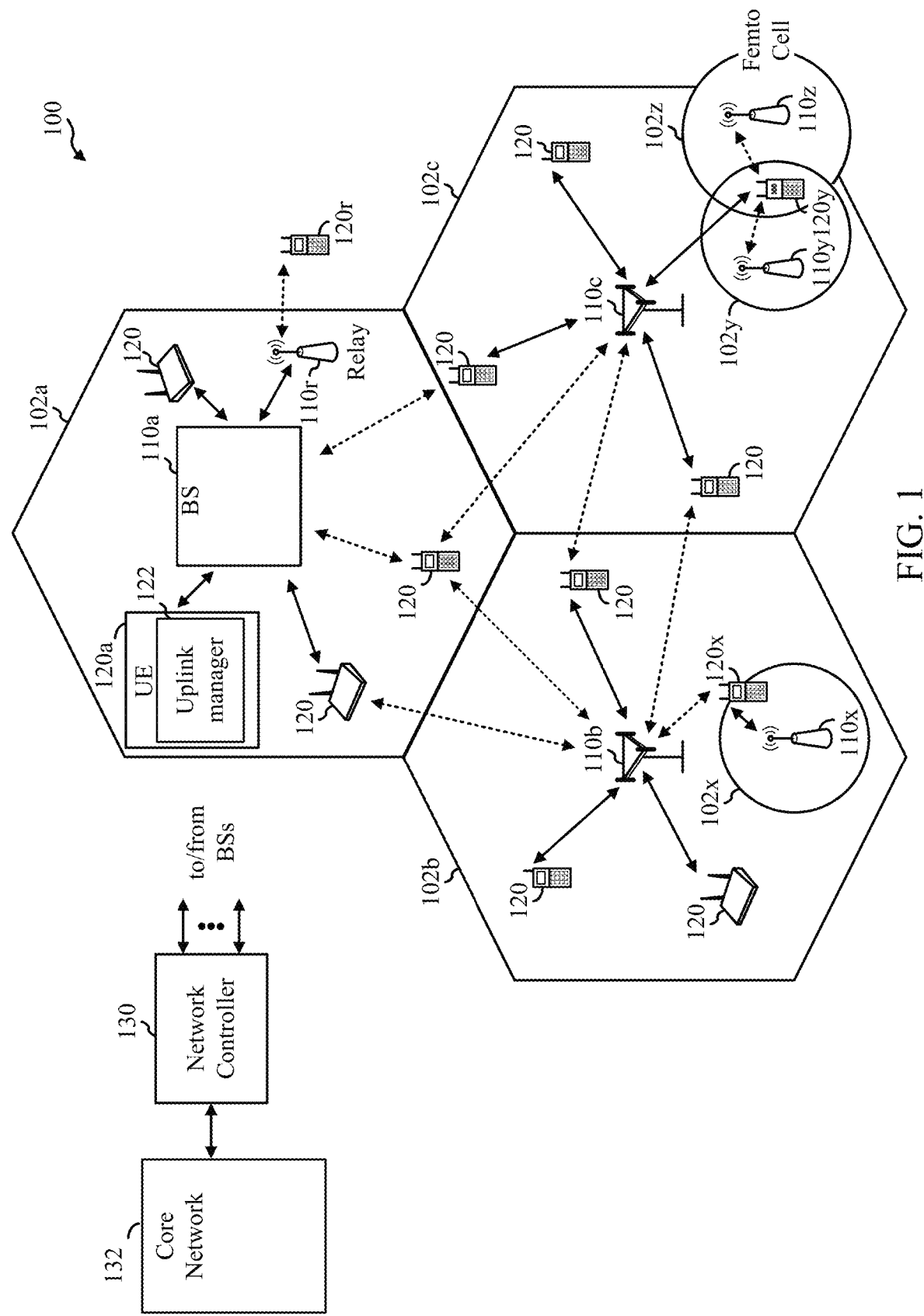
FIG. 1 is a block diagram conceptually illustrating an example telecommunications system, in accordance with certain aspects of the present disclosure.

Aspects of the present disclosure provide apparatus, methods, processing systems, and computer-readable mediums for autonomous uplink (UL) cancellation in full-duplex or flexible-duplex modes. As will be explained in more detail herein, certain aspects provide techniques for improving downlink (DL) reception when configured using a full-duplex (FD) or flexible-duplex mode of communication. For example, when a UL transmission is scheduled to overlap a DL transmission in the time domain, a user equipment (UE) may determine whether to cancel a portion of the UL transmission to facilitate proper reception and decoding of the DL reception. The decision of whether to cancel the UL transmission may be based on one or more factors, such as the type of transmissions, a priority associated with the transmissions, or various configuration parameters associated with the transmissions, as described in more detail herein. For instance, if the DL transmission has a higher priority than the UL transmission, the UE may determine to cancel the UL transmission to increase reliability of reception of the higher priority DL transmission. Accordingly, aspects described herein improve FD and flexible-duplex operations and protect DL reception.

The following description provides examples of autonomous uplink cancellation in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 megahertz (MHz) or beyond), millimeter wave (mmW) targeting high carrier frequency (e.g., 25 gigahertz (GHz) or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may be in communication with one or more base station (BSs) 110 and/or UEs 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for autonomous UL cancellation in full-duplex. As shown in FIG. 1, the UE 120a includes a UL manager 122. The UL manager 122 may be configured to receive one or more configurations scheduling a communication with at least one BS, wherein the one or more configurations schedule a UL transmission and a DL transmission such that the UL transmission and the DL transmission overlap in a time domain; determine whether to cancel at least a portion of the UL transmission based on one or more conditions associated with the UL transmission or the DL transmission, wherein the determination of whether to cancel at least the portion of the UL transmission is in response to the UL transmission and the DL transmission overlapping in the time domain; and perform the communication based on the determination, in accordance with certain aspects of the present disclosure.

Figure 2:
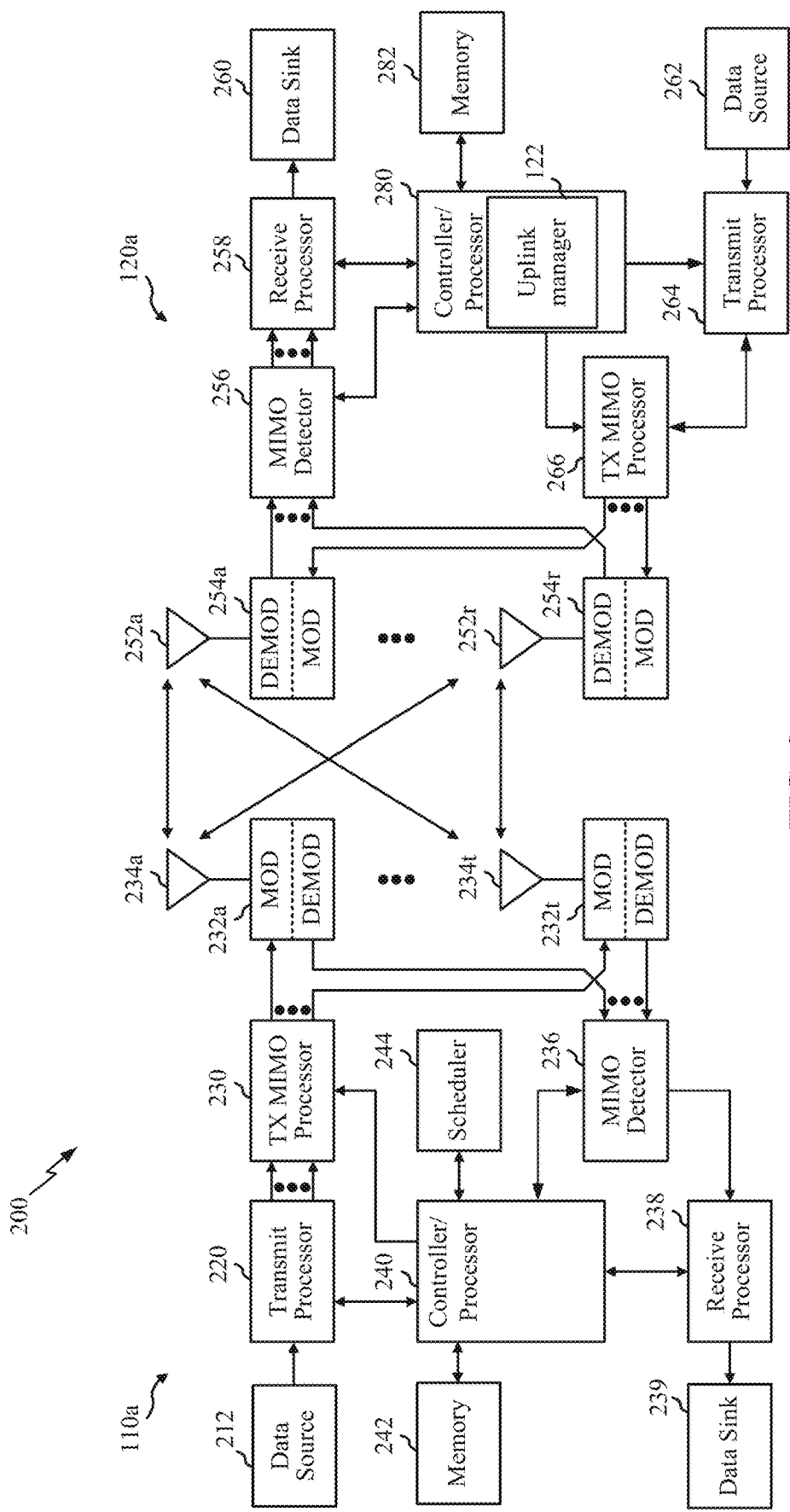
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. DL signals from modulators in transceivers 232a-232t may be transmitted via the antennas 234a-234t, respectively.

At the UE 120a, the antennas 252a-252r may receive the DL signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the UL, at UE 120a, a transmit processor 264 may receive and process data (e.g., for the PUSCH) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for single-carrier frequency division multiplexing (SC-FDM), etc.), and transmitted to the BS 110a. At the BS 110a, the UL signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the DL and/or UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has the UL manager 122, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the UL and DL. NR may support half-duplex operation using time division duplexing (TDD). OFDM and SC-FDM partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kilohertz (kHz) and other SCS may be defined with respect to the base SCS (e.g., 30 kHz, 60 kHz, 120 kHz, 240 kHz, etc.).

Figure 3:
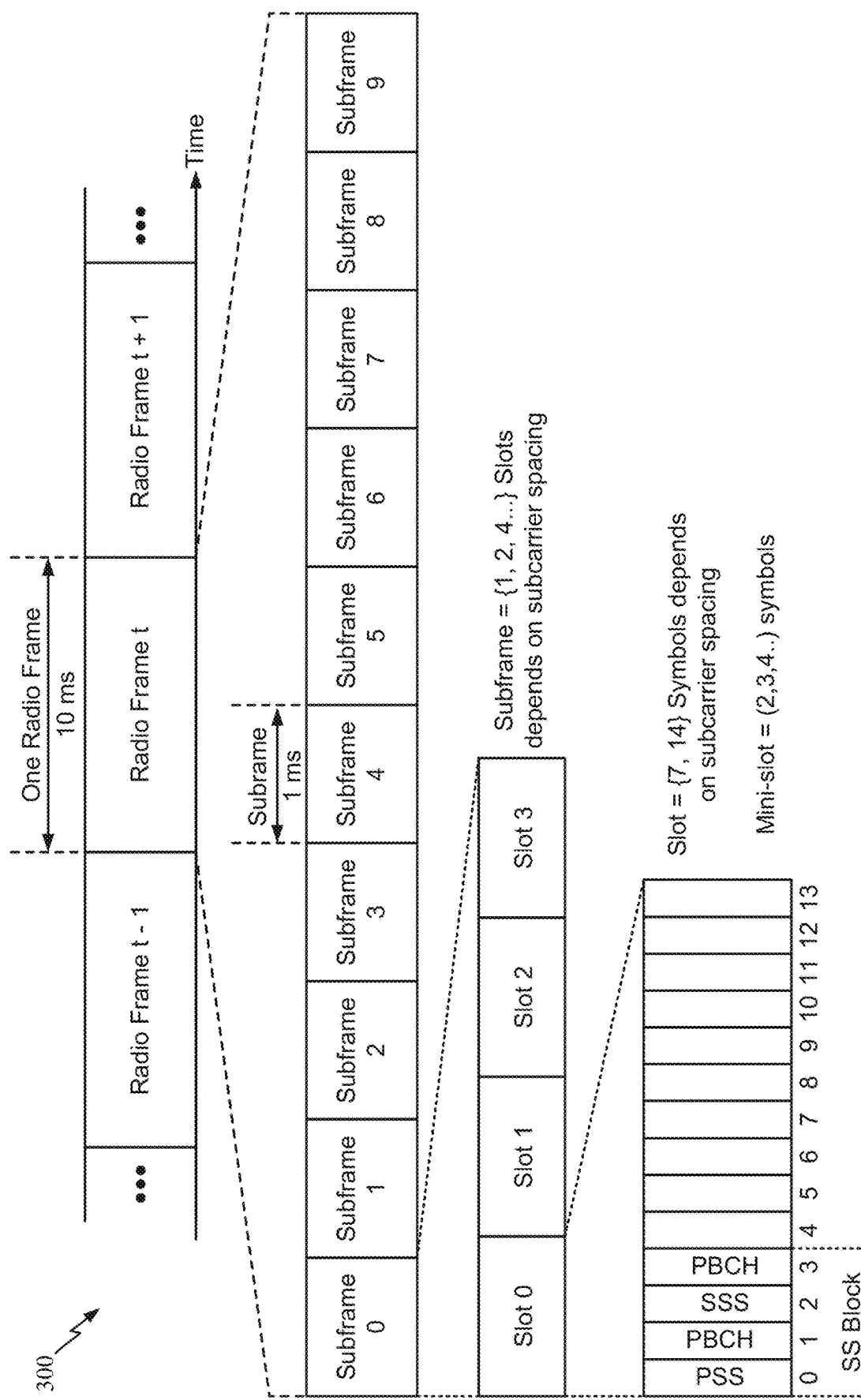
FIG. 3 is an example frame format for new radio (NR), in accordance with certain aspects of the present disclosure.

FIG. 3 is a diagram showing an example of a frame format 300 for NR. The transmission timeline for each of the DL and UL may be partitioned into units of radio frames. Each radio frame may have a predetermined duration (e.g., 10 milliseconds (ms)) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

EXAMPLE TECHNIQUES FOR AUTONOMOUS UPLINK (UL) CANCELLATION

Figure 4A:
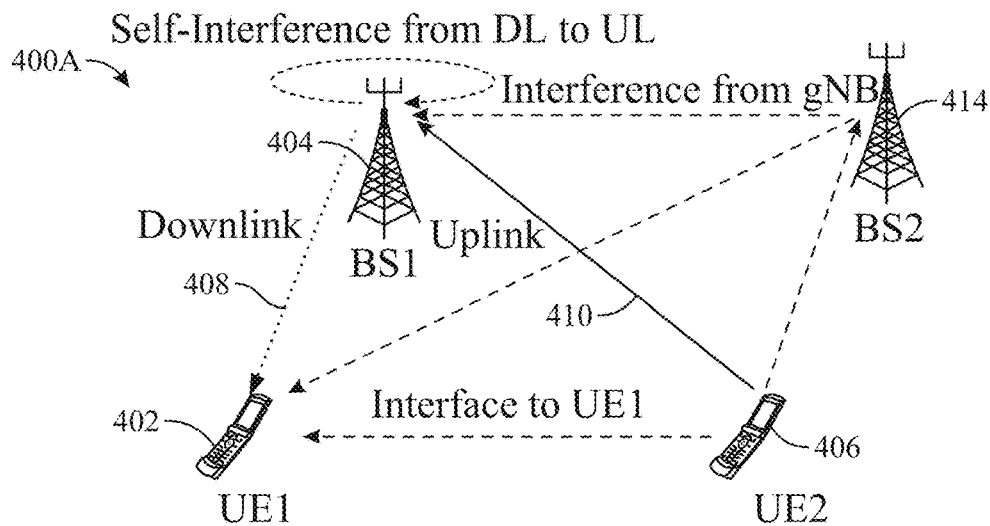
FIGS. 4A-4C are diagrams of example full-duplex (FD) communication deployments, in accordance with certain aspects of the present disclosure.
Figure 4B:
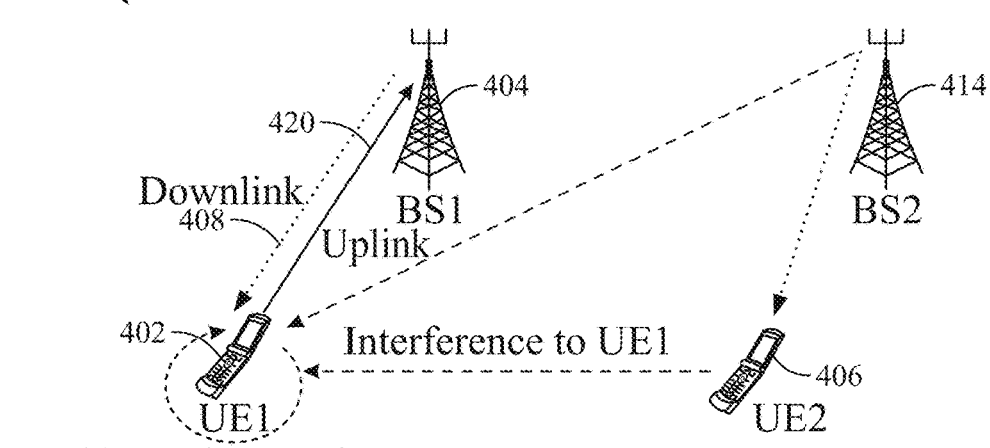
Figure 4C:
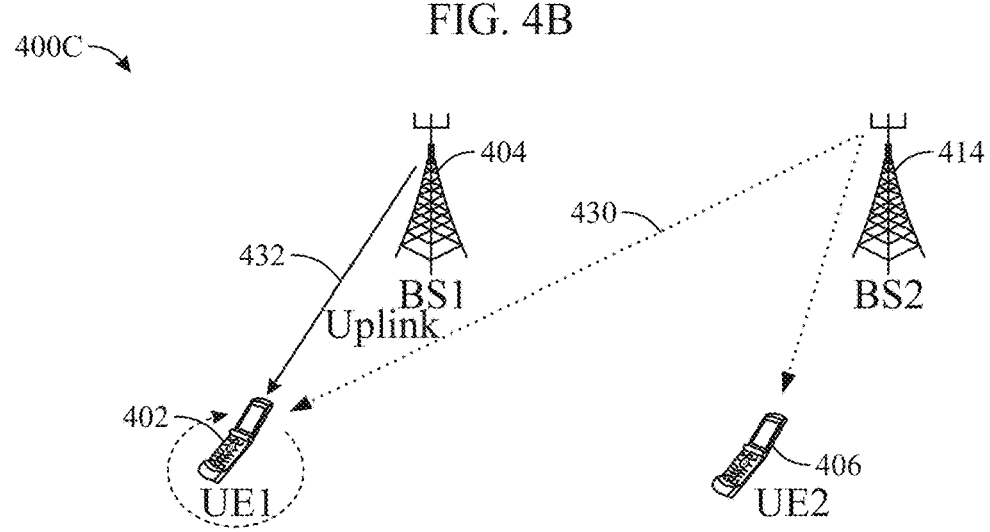

FIGS. 4A-4C are diagrams of example full-duplex (FD) communication (also referred to herein as FD operations or FD mode of operation) deployments, in accordance with certain aspects of the present disclosure. FD communication is the ability to transmit and receive simultaneously in the same spectrum band, while in half-duplex (HD) communication, the ability to communicate (e.g., transmit and receive) is not simultaneous, e.g., HD communication provides a two-way directional communication but with communication in one direction at a time.

FIG. 4A illustrates a deployment 400A including an FD base station (BS) and an HD UE. As illustrated, a user equipment (UE) 402 (e.g., HD UE) may receive a DL transmission 408 from a BS 404 (e.g., FD BS), while another UE 406 may send an UL transmission 410 to the same BS 404. UL transmission 410 and DL transmission 408 may overlap in the time domain. BS 404, operating in an FD mode, may thus experience self-interference from DL transmission 408 to the reception by BS 404 of UL transmission 410. Further, as shown, UE 402 may experience interference from UE 406 and another BS 414, and BS 404 may experience interference from BS 414.

FIG. 4B illustrates a deployment 400B including an FD BS and an FD UE. As illustrated, UE 402 may receive a DL transmission 408 from BS 404 and transmit an UL transmission 420 to the same BS 404. Thus, both UE 402 and BS 404 are operating in FD mode. UE 402 may experience self-interference from UL transmission 420 to the reception by UE 402 of DL transmission 408. In other words, UL transmission 420 may cause interference and prevent proper reception and decoding of DL transmission 408. Further, as shown, UE 402 may experience interference from UE 406 and BS 414 while UE 406 is receiving DL transmissions from BS 414.

FIG. 4C illustrates a deployment 400C including an FD UE with multi-transmission/reception point (TRP) communication. UE 402 may receive a DL transmission 430 from BS 414 and transmit an UL transmission 432 to BS 404. DL transmission 430 and UL transmission 432 may overlap in the time-domain. Thus, UE 402 may be operating in FD mode. UE 402 may experience self-interference from UL transmission 432 to the reception by UE 402 of DL transmission 430. In other words, UL transmission 420 may cause interference and prevent proper reception and decoding of DL transmission 408. Further, as shown, UE 406 may receive DL transmissions from BS 414.

Figure 5A:
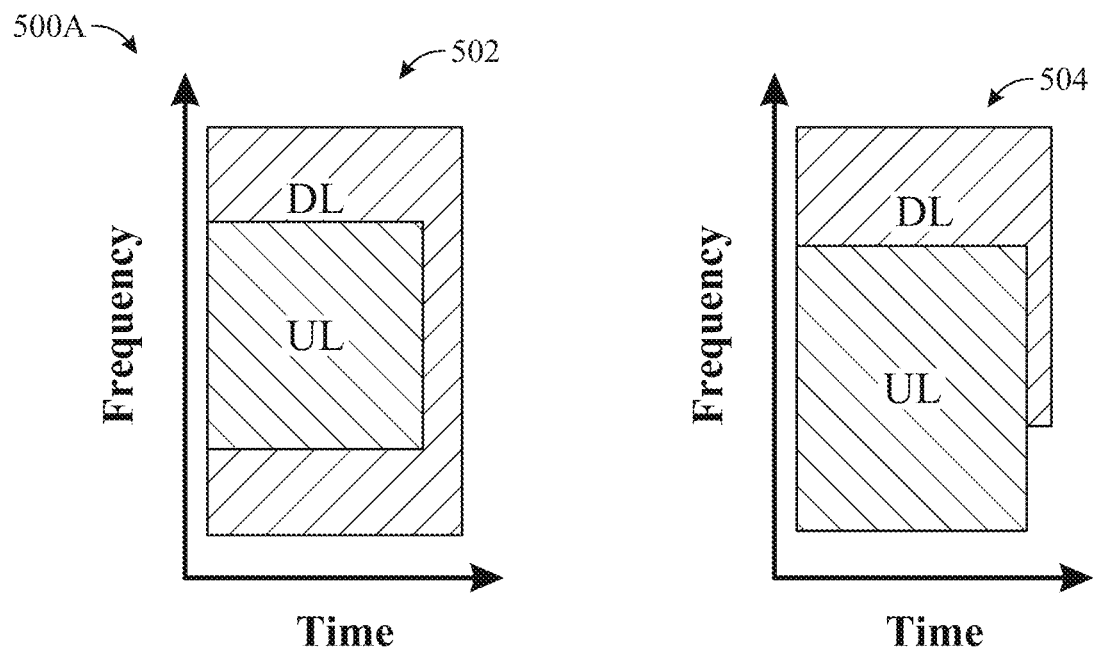
FIGS. 5A-5B illustrate example time and frequency resources for uplink (UL) and downlink (DL) during FD operations, in accordance with certain aspects of the present disclosure.
Figure 5B:
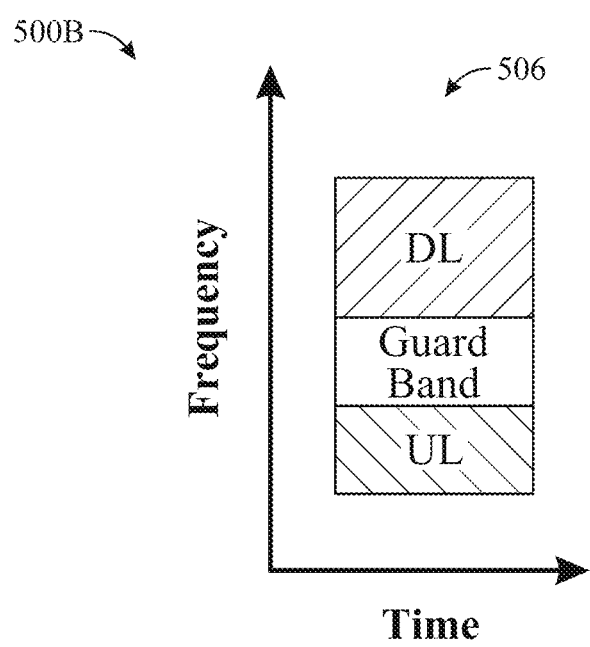

FIGS. 5A-5B illustrate example time and frequency resources for UL and DL transmissions during FD operations, in accordance with certain aspects of the present disclosure. As illustrated in FIG. 5A, which depicts an in-band FD (IBFD) operation 500A, UL and DL transmissions may be on the same time and/or frequency resources. As shown, in both of spectrums 502, 504, the UL and DL transmissions may be partially overlapped in time and/or frequency. Although not shown, the UL and DL transmissions may be completely overlapped in time and/or frequency, in some implementations.

As illustrated in FIG. 5B, which depicts sub-band frequency division duplex (FDD) (e.g., also referred to as "flexible-duplex") 500B, UL and DL transmissions may occur at the same time (e.g., overlap in the time domain), but in different frequency resources. As illustrated in the spectrum 506, the DL resource may be separated from the UL resource in the frequency domain by a guard band (e.g., used to help prevent interference). While the UL and DL transmissions are separated by a guard band, the UL and DL transmissions are scheduled within the same frequency band and are scheduled close together in the frequency domain. Therefore, the UL transmission may cause interference with the DL transmission, the severity of which being dependent on the adjacent channel leakage ratio (ACLR) associated with the UL transmission. While certain examples provided herein may be described with respect to an FD operation to facilitate understanding, the aspects described herein are applicable to any scenario where UL and DL transmissions overlap in the time domain, such as in FD and flexible-duplex implementations, as described.

Aspects of the present disclosure provide techniques for autonomous uplink (UL) cancellation in FD or flexible-duplex mode. As used herein, autonomous refers to the ability of an entity (e.g., UE) to independently act without direction from another. In particular, certain aspects are directed to a UE determining to cancel an UL transmission that is scheduled to overlap in the time domain with a DL transmission using FD or flexible-duplex modes of communication. For example, the UE may cancel the UL transmission to facilitate reception and decoding of the DL transmission. The decision of whether to cancel the UL transmission may be based on one or more factors, such as the type of transmissions, a priority associated with the transmissions, or various configuration parameters associated with the transmissions, as described in more detail herein.

Figure 6:
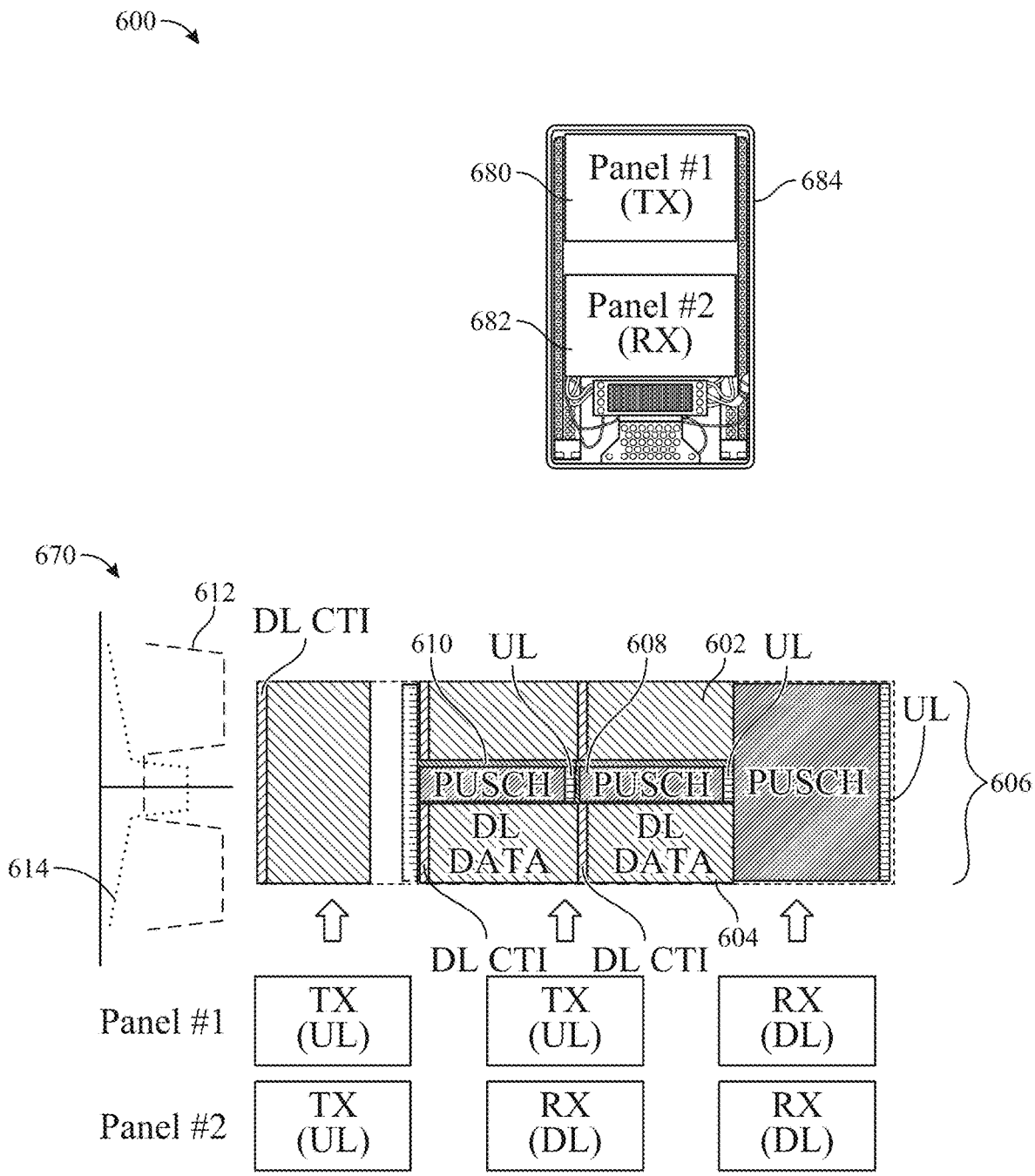
FIG. 6 is an example architecture for FD operations, in accordance with certain aspects of the present disclosure.

FIG. 6 is an example implementation 600 for flexible-duplex operation, in accordance with certain aspects of the present disclosure. As shown, a UE 684 (e.g., corresponding to UE 120a illustrated in FIGS. 1 and 2) may include two separate antenna panels 680, 682 for simultaneous transmission and reception operations. For example, antenna panel 680 may be for UL transmissions (e.g., of a physical uplink shared channel (PUSCH)) at both edges 602, 604 of a band 606, while antenna panel 682 may be for DL reception (e.g., DL data) at a center 608 of the band 606. As shown, the DL transmissions (e.g., DL reception from the perspective of UE 684) and UL transmissions may be in different portions of the band, with a guard band 610 between the UL and DL resources.

Diagram 670 illustrates a power spectral density (PSD) 612 for the DL transmission, and a PSD 614 for the UL transmission. As shown, the power from the UL transmission may leak into the frequency resources allocated for the DL transmission due to the adjacent channel leakage ratio (ACLR) associated with the UL transmission, causing self-interference.

Various techniques may be used to reduce the self-interference described herein. For example, separate panels may be used for DL and UL transmissions, as described. For sub-band FD implementations, a reception (RX)-windowed overlap-and-add (WOLA) technique may be used to reduce the ACLR of the UL transmission thereby reducing the interference from the UL transmission to the DL transmission. In some cases, an analog low pass filter (LPF) may be used to improve analog to digital converter (ADC) dynamic range, and RX-automatic gain control (AGC) states may be improved to improve the noise figure (NF) associated with a receiver.

However, despite efforts to mitigate adjacent channel leakage, a UL transmission may still cause interference to the reception of the DL transmission depending on a number of factors, such as the UL transmission power, the size of a guard band between the DL and UL transmissions, or the DL and UL beams that are used.

Accordingly, what is needed are techniques and apparatus for protecting the decoding of the DL transmission. For example, depending on a priority associated with a DL transmission, a UE may cancel the UL transmission to preserve the DL reception.

Figure 7:
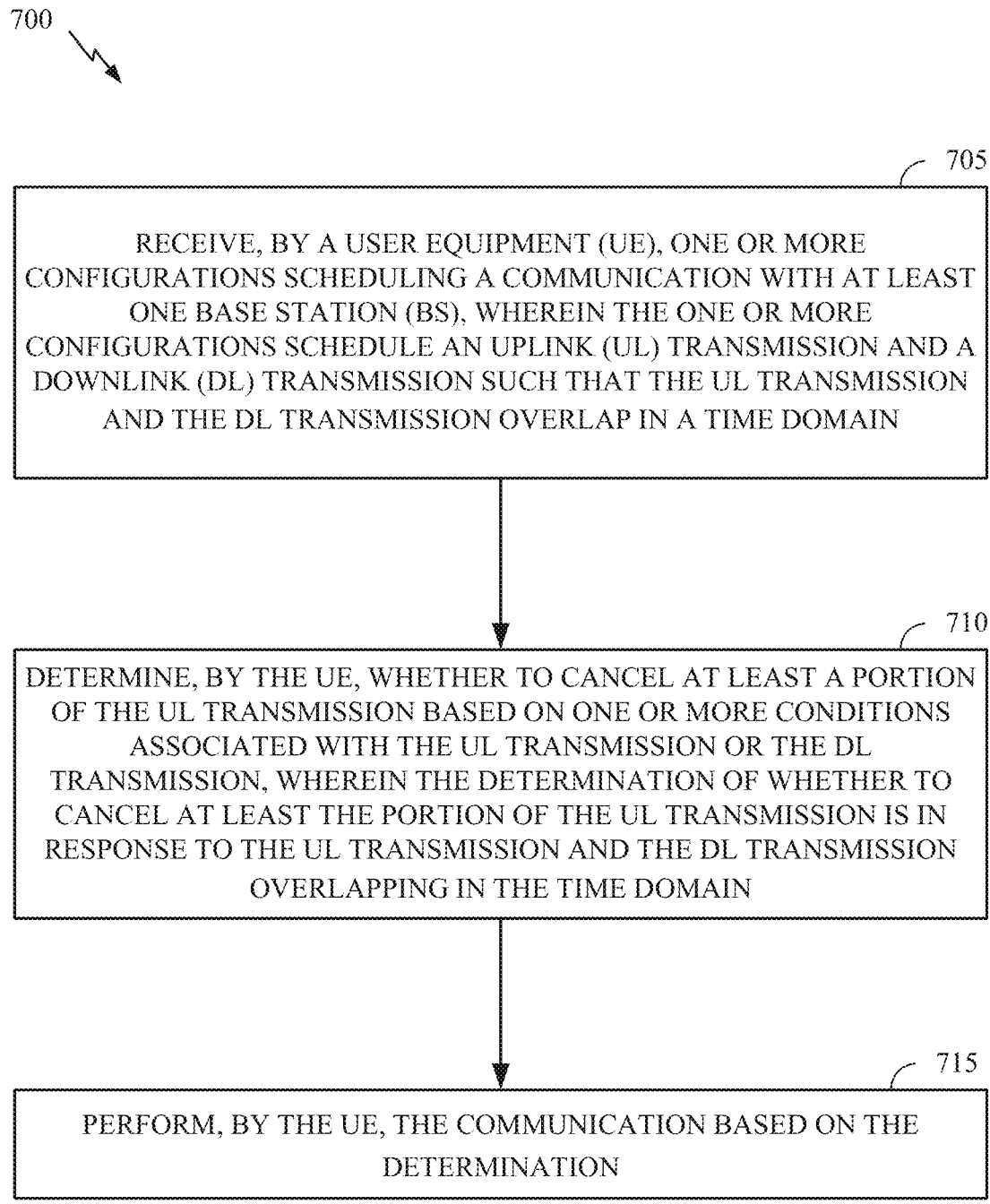
FIG. 7 is a flow diagram illustrating example operations for wireless communication by a UE, in accordance with certain aspects of the present disclosure.

FIG. 7 is a flow diagram illustrating example operations 700 for wireless communication by a UE, in accordance with certain aspects of the present disclosure. For example, operations 700 may be performed UE 120a in the wireless communication network 100.

Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 700 may begin, at block 705, with the UE receiving one or more configurations scheduling a communication with at least one BS. The one or more configurations may schedule an UL transmission and a DL transmission such that the UL transmission and the DL transmission overlap in the time domain. In other words, the UL transmission and the DL transmission may be scheduled for communication using an FD or flexible-duplex mode of communication, as described herein.

At block 710, the UE determines whether to cancel at least a portion of the UL transmission based on one or more conditions associated with the UL transmission or the DL transmission. The determination of whether to cancel at least the portion of the UL transmission may be in response to the UL transmission and the DL transmission overlapping in the time domain. At block 715, the UE performs the communication based on the determination. As used herein, an UL transmission (also referred to as UL reception from the perspective of a network entity, BS, gNB, etc.) or DL transmission (also referred to as DL reception from the perspective of a UE) generally refers to any UL or DL channel or signal.

In some cases, the UE configured with DL reception and UL transmission at the same time may cancel the UL transmission, either partially or completely. For example, even when a portion of a UL transmission overlaps with a DL transmission, the entirety of the UL transmission may be cancelled. As another example, if the UE cancels the UL transmission partially, the UE may only cancel the UL transmission in symbols that overlap with the DL transmission. Alternatively, the UE may cancel the UL transmission starting from the overlapping symbols to the end of the UL transmission. In other words, only the portion of the UL transmission starting from the first symbol (e.g., initial symbol) of the UL transmission that overlaps with the DL transmission to the end of the UL transmission may be cancelled.

In certain aspects, the decision of whether to cancel a UL transmission may be performed at a physical (PHY) layer of the UE, or performed at a higher layer of the UE and indicated to the PHY layer. If the decision of whether to perform UL cancellation is performed at the PHY layer, the decision may be based on certain radio resource control (RRC) configurations, as described further herein (e.g., with respect to FIG. 8). If the decision regarding UL cancellation is performed at a higher layer, such as the RRC layer or a media access control (MAC) layer of the UE, the higher layer may send an indication to the PHY layer to cancel the UL transmission. The decision at the higher layer may be based on a priority of the received DL signal, as described in more detail herein.

Figure 8:
FIG. 8 is a table illustrating example conditions for autonomous UL cancellation, in accordance with certain aspects of the present disclosure.

FIG. 8 is a table 800 illustrating example conditions for determining whether to cancel a UL transmission, in accordance with certain aspects of the present disclosure. In some cases, the UE may be configured (e.g., RRC configured) with conditions/triggers for autonomous UL cancellation. For example, the decision of whether to trigger UL cancellation may be based on the UL transmission power, the expected level of self-interference power associated with the UL transmission, the UL resource allocation, the guard-band between the DL and UL transmissions, as well as the DL allocation (e.g., frequency resources allocated for the DL transmission), the power of the DL transmission, the modulation and coding scheme (MCS) associated with the DL transmission, the priority associated with the DL transmission, or any combination thereof. The UE may cancel the UL transmission based on one or more of these UL cancellation triggers. For example, an autonomous UL cancellation may occur if a given RRC configured threshold for any of the criteria is met, and/or if a combination of previous triggers in a pre-configured matter is met.

As an example, referring to table 800, the UE may determine to forgo canceling (shown as "Don't cancel" in the second row of table 800) the UL transmission if the UL transmission power is below a first threshold (th1), the expected self-interference power is above a second threshold (th2), the guard-band between the DL and UL transmissions has a size that is greater than a third threshold (th3), and the DL allocation, power, and MCS meet a particular condition (Cond. 2). Alternatively (shown as "Cancel" in the third row of table 800), the UE may determine to cancel the UL transmission if the UL transmission power is above th1, the expected self-interference power is below th2, the guard-band between the DL and UL transmissions has a size that is less than th3, and the DL allocation, power, and MCS meet a particular condition (Cond. 3).

In some implementations, if a UL transmission is received correctly by a BS, the BS may transmit, and the UE may receive a hybrid automatic repeat request (HARQ) acknowledgment (ACK) indicating the successful reception of the UL transmission. Alternatively, the BS may transmit a negative ACK (NACK) if the BS fails to receive a configured UL transmission. However, due to the ability of the UE to autonomously cancel UL transmission, the BS might not know whether the UE has transmitted the UL transmission or not (e.g., whether the UL transmission was cancelled to preserve DL reception).

In certain aspects, the BS may treat the cancellation (e.g., not receiving the UL transmission) as a missed UL transmission, and send a NACK to the UE, triggering the UE to retransmit the UL transmission. In this case, the UE may use different resources to avoid FD transmission (e.g., use HD communication) in an attempt to avoid further cancellations of the UL transmission.

In some aspects, the UE may transmit an indication to the network (e.g., BS) that the UL transmission was canceled (e.g., because of FD transmission). In this case, the UE indication of UL cancellation may be in the form of UL control information (UCI). Transmitting the indication of UL cancellation via UCI to the BS may allow the BS to schedule a better resource allocation in the future. For instance, the BS may allocate resources for the UL transmission (or retransmission) such that the UL transmission may occur without FD (or flexible-duplex) mode of operation.

In some cases, the UE may be configured with certain exceptions when deciding whether to apply UL cancellation. For example, autonomous UL cancellation may not apply to certain UL signals. Such UL signals may include one or more of physical random access channel (PRACH) transmissions, 2-step random access channel (RACH) occasions, physical UL shared channel (PUSCH) transmissions, physical UL control channel (PUCCH) transmissions, PUSCH transmissions, retransmissions of PUSCH, and sounding reference signal (SRS) transmissions. For instance, the UE may be configured to forgo canceling an UL transmission if the UL transmission is a PRACH due to the high priority associated therewith.

In some cases, in order to avoid too many cancellations for UL transmissions, the UE may be configured to change (increase) the priority of an UL transmission every time the UL transmission is canceled. In certain aspects, the priority associated with an UL transmission (e.g., UL channel/signal priority) may be increased in an independent manner. In other words, if a PUSCH is canceled, a priority associated with PUSCH may be increased independently of the priority associated with other UL transmissions (e.g., PUCCH).

In certain aspects, the priority of UL transmissions may be determined based on an ordering of different DL and UL transmissions, where the order of the UL transmission moves up in the list every time the UL transmission is canceled (e.g., transmissions at the top of the list have higher priority than transmissions at the bottom of the list). In other words, the UE may maintain a list of UL and DL transmissions (e.g., PDSCH, PDCCH, PUSCH, PUCCH, RACH, etc.) that provides the relative priorities associated with candidate UL and DL transmissions. In this manner, the DL reception), the UE would determine to forgo canceling the UL transmission.

In another implementation, the priority of each UL channel/signal may be given by a number (e.g., also referred to as a priority value). For example, the priority value of an UL transmission may be incremented by a given step size each time the UL transmission is canceled. The step size associated with incrementing an UL transmission may depend on the type of the UL transmission. For example, the UE may be configured to increment a priority value associated with a PUSCH transmission by one each time the PUSCH is canceled, but increment a priority value associated with a RACH transmission by two each time the RACH transmission is canceled. In this manner, the UE may be able to control how often certain types of UL transmissions may be canceled due to the priorities associated with such transmissions. In this case, if the priority of a specific UL transmission is above an RRC configured value, the UE may determine to forgo canceling the UL transmission.

EXAMPLE WIRELESS COMMUNICATIONS DEVICES

Figure 9:
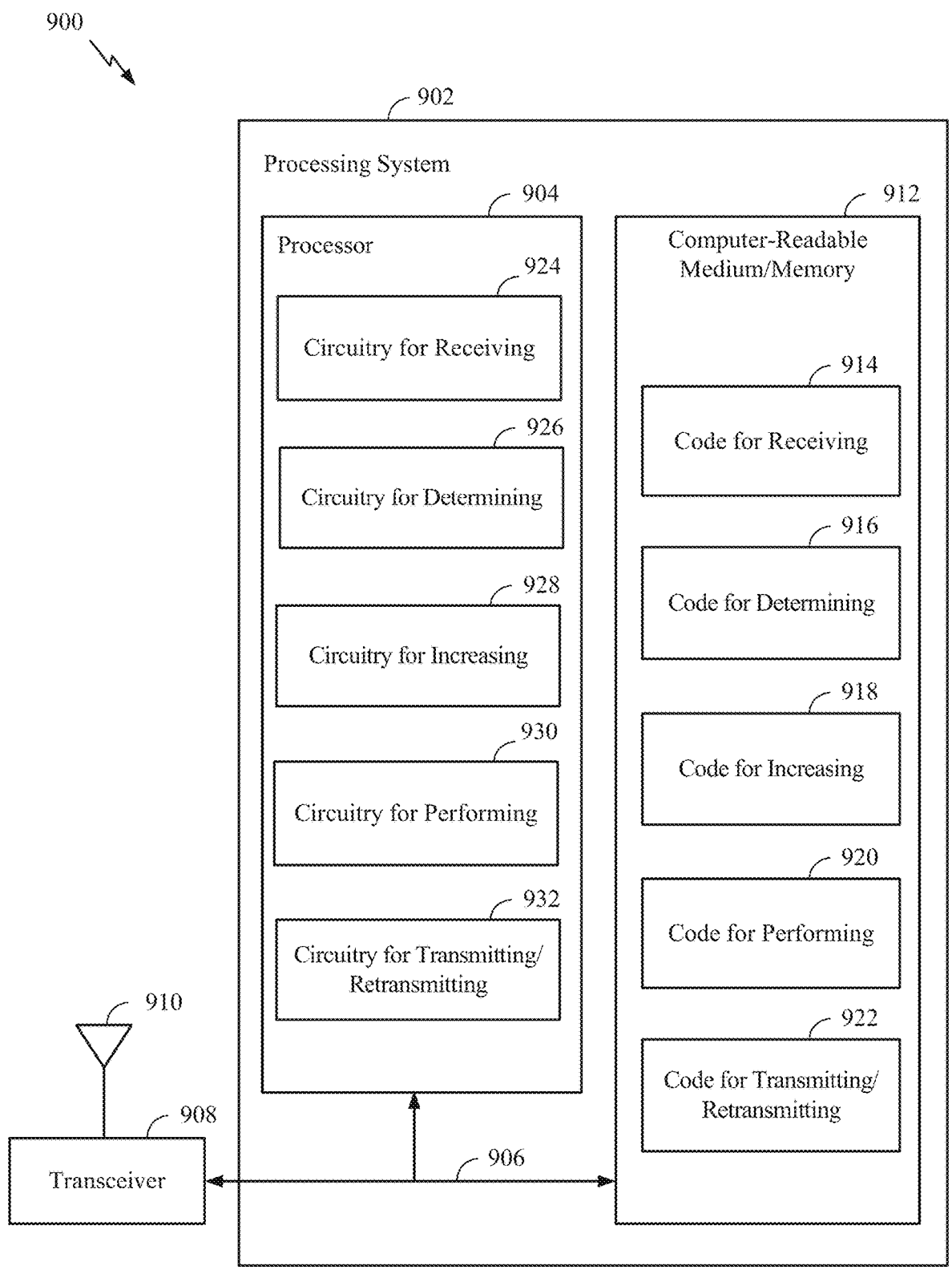
FIG. 9 illustrates a communications device that may include various components configured to perform operations for the techniques disclosed herein, in accordance with aspects of the present disclosure.

FIG. 9 illustrates a communications device 900 that may include various components (e.g., corresponding to means-plus-function components) operable, configured, or adapted to perform operations for the techniques disclosed herein, such as the operations illustrated in FIG. 7. In some examples, communications device 900 may be a UE, such as UE 120*a* as described with respect to FIGS. 1 and 2.

Communications device 900 includes a processing system 902 (e.g., corresponding to controller/processor 280) coupled to a transceiver 908 (e.g., a transmitter and/or a receiver). Transceiver 908 may correspond to one or more of the transmit processor 264, TX MIMO processor 266, modulator/demodulator 254, receive processor 258, and MIMO detector 256. Transceiver 908 is configured to transmit and receive signals for the communications device 900 via an antenna 910, such as the various signals as described herein. Processing system 902 may be configured to perform processing functions for the communications device 900, including processing signals received and/or to be transmitted by the communications device 900.

Processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 7, or other operations for performing the various techniques discussed herein for autonomous uplink (UL) cancellation in full-duplex mode.

In certain aspects, computer-readable medium/memory 912 stores code 914 (an example means for) for receiving; code 916 (an example means for) for determining; code 918 (an example means for) for increasing; code 920 (an example means for) for performing; and code 922 (an example means for) for transmitting/retransmitting.

In certain aspects, code 914 for receiving may include code for receiving one or more configurations scheduling a communication with at least one base station (BS), wherein the one or more configurations schedule an UL transmission and a downlink (DL) transmission such that the UL transmission and the DL transmission overlap in a time domain. In certain aspects, code 914 for receiving may include code for receiving a negative acknowledgment (NACK) indicating that the UL transmission was not decoded at the BS. In certain aspects, code 914 for receiving may include code for receiving an allocation of resources for retransmitting the UL transmission using half-duplex (HD) communication.

In certain aspects, code 916 for determining may include code for determining whether to cancel at least a portion of the UL transmission based on one or more conditions associated with the UL transmission or the DL transmission, wherein the determination of whether to cancel at least the portion of the UL transmission is in response to the UL transmission and the DL transmission overlapping in the time domain.

In certain aspects, code 918 for increasing may include code for increasing a priority associated with the UL transmission each time the UL transmission is canceled, wherein the determination of whether to cancel the UL transmission is based on the priority.

In certain aspects, code 920 for performing may include code for performing the communication based on the determination.

In certain aspects, code 922 for transmitting/retransmitting may include code for retransmitting the UL transmission in response to the reception of the NACK. In certain aspects, code 922 for transmitting may include code for transmitting an indication that at least the portion of the UL transmission was canceled due to the UL transmission and the DL transmission overlapping in the time domain.

In certain aspects, the processor 904 has circuitry configured to implement the code stored in the computer-readable medium/memory 912. The processor 904 includes circuitry 924 (an example means for) for receiving; circuitry 926 (an example means for) for determining; circuitry 928 (an example means for) for increasing; circuitry 930 (an example means for) for performing; and circuitry 932 (an example means for) for transmitting/retransmitting.

In certain aspects, circuitry 924 for receiving may include circuitry for receiving one or more configurations scheduling a communication with at least one BS, wherein the one or more configurations schedule a UL transmission and a DL transmission such that the UL transmission and the DL transmission overlap in a time domain. In certain aspects, circuitry 924 for receiving may include circuitry for receiving a NACK indicating that the UL transmission was not decoded at the BS. In certain aspects, circuitry 924 for receiving may include circuitry for receiving an allocation of resources for retransmitting the UL transmission using HD communication.

In certain aspects, circuitry 926 for determining may include circuitry for determining whether to cancel at least a portion of the UL transmission based on one or more conditions associated with the UL transmission or the DL transmission, wherein the determination of whether to cancel at least the portion of the UL transmission is in response to the UL transmission and the DL transmission overlapping in the time domain.

In certain aspects, circuitry 928 for increasing may include circuitry for increasing a priority associated with the UL transmission each time the UL transmission is cancelled, wherein the determination of whether to cancel the UL transmission is based on the priority.

In certain aspects, circuitry 930 for performing may include circuitry for performing the communication based on the determination.

In certain aspects, circuitry 932 for transmitting/retransmitting may include circuitry for retransmitting the UL transmission in response to the reception of the NACK. In certain aspects, circuitry 932 for transmitting may include circuitry for transmitting an indication that at least the portion of the UL transmission was cancelled due to the UL transmission and the DL transmission overlapping in the time domain.

The compression manager 112 may support wireless communication in accordance with examples as disclosed herein.

The UL manager 122 may be an example of means for performing various aspects described herein. The UL manager 122, or its sub-components, may be implemented in hardware (e.g., in UL resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, the UL manager 122, or its sub-components, may be implemented in code (e.g., as configuration management software or firmware) executed by a processor, or any combination thereof. If implemented in code executed by a processor, the functions of the UL manager 122, or its sub-components may be executed by a general-purpose processor, a DSP, an ASIC, a FPGA or other programmable logic device.

In some examples, the UL manager 122 may be configured to perform various operations (e.g., receiving, determining, transmitting/sending) using or otherwise in cooperation with the transceiver 908.

The UL manager 122, or its sub-components, may be physically located at various positions, including being distributed such that portions of functions are implemented at different physical locations by one or more physical components. In some examples, the UL manager 122, or its sub-components, may be a separate and distinct component in accordance with various aspects of the present disclosure. In some examples, the UL manager 122, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

EXAMPLE CLAUSES

Implementation examples are described in the following numbered clauses:

Clause 1: A method for wireless communications by a user equipment (UE), comprising: receiving one or more configurations scheduling a communication with at least one base station (BS), wherein the one or more configurations schedule an uplink (UL) transmission and a downlink (DL) transmission such that the UL transmission and the DL transmission overlap in a time domain; determining whether to cancel at least a portion of the UL transmission based on one or more conditions associated with the UL transmission or the DL transmission, wherein the determination of whether to cancel at least the portion of the UL transmission is in response to the UL transmission and the DL transmission overlapping in the time domain; and performing the communication based on the determination.

Clause 2: The method of Clause 1, wherein the UL transmission and the DL transmission are scheduled in a same frequency band.

Clause 3: The method of Clause 1 or 2, wherein the UL transmission and the DL transmission overlap in a frequency domain and the time domain.

Clause 4: The method of any of Clauses 1-3, wherein the determining whether to cancel at least the portion of the UL transmission comprises determining to cancel an entirety of the UL transmission.

Clause 5: The method of any of Clauses 1-4, wherein the determining whether to cancel at least the portion of the UL transmission comprises determining to cancel the portion of the UL transmission overlapping in the time domain with the DL transmission.

Clause 6: The method of any of Clauses 1-5, wherein the determining whether to cancel at least the portion of the UL transmission comprises determining to cancel the portion of the UL transmission starting from an initial symbol overlapping in the time domain with the DL transmission till an end of the UL transmission.

Clause 7: The method of any of Clauses 1-6, wherein the determination is made by a physical (PHY) layer of the UE.

Clause 8: The method of any of Clauses 1-7, wherein the determination is made by a layer of the UE that is higher than a PHY layer of the UE.

Clause 9: The method of Clause 8, wherein the layer that is higher than the PHY layer comprises a radio resource control (RRC) layer or a medium access control (MAC) layer.

Clause 10: The method of any of Clauses 1-9, wherein the one or more conditions comprise one or any combination of: a transmission power associated with the UL transmission; an expected level of self-interference power associated with the UL transmission; an allocation of the UL transmission in a frequency domain; a guard-band between the DL transmission and the UL transmission; an allocation of the DL transmission; a power associated with the DL transmission; a modulation and coding scheme (MCS) associated with the DL transmission; and a priority associated with the DL transmission.

Clause 11: The method of any of Clauses 1-10, further comprising: receiving a negative acknowledgment (NACK) indicating that the UL transmission was not decoded at the BS; and retransmitting the UL transmission in response to the reception of the NACK.

Clause 12: The method of Clause 11, wherein the retransmission of the UL transmission is via half-duplex (HD) communication if the at least the portion of the UL transmission was cancelled.

Clause 13: The method of any of Clauses 1-12, further comprising transmitting an indication that at least the portion of the UL transmission was cancelled due to the UL transmission and the DL transmission overlapping in the time domain.

Clause 14: The method of claim 13, wherein the indication is transmitted via uplink control information (UCI).

Clause 15: The method of Clause 13 or 14, further comprising receiving an allocation of resources for retransmitting the UL transmission using HD communication.

Clause 16: The method of any of Clauses 1-15, wherein the determination of whether to cancel at least the portion of the UL transmission depends, at least in part, on a type of the UL transmission.

Clause 17: The method of Clause 16, wherein the determining whether to cancel at least the portion of the UL transmission comprises determining to forgo cancelling the UL transmission if the type of the UL transmission comprises one or more of: a physical random access channel (PRACH) transmission; a physical uplink control channel (PUCCH) transmission; a physical uplink shared channel (PUSCH) transmission; a retransmission of a PUSCH; or a sounding reference signal (SRS) transmission.

Clause 18: The method of any of Clauses 1-17, further comprising increasing a priority associated with the UL transmission each time the UL transmission is cancelled, wherein the determination of whether to cancel the UL transmission is based on the priority.

Clause 19: The method of any of Clauses 1-18, further comprising determining whether a priority of the UL transmission is less than a priority of the DL transmission based on a list of relative priorities associated with candidate UL and DL transmissions, wherein the UL transmission is cancelled if the priority of the UL transmission is less than the priority of the DL transmission.

Clause 20: The method of any of Clauses 1-19, wherein the UL transmission is associated with a priority value, the priority value being incremented each time the UL transmission is cancelled, wherein the determination of whether to cancel at least the portion of the UL transmission is based on the priority value.

Clause 21: The method of Clause 20, wherein a step size associated with incrementing the priority value is dependent on a type of the UL transmission.

Clause 22: The method of Clause 20 or 21, wherein the determination of whether to cancel at least the portion of the UL transmission is based on whether the priority value is greater than a threshold.

Clause 23: The method of Clause 22, wherein the threshold is RRC configured.

Clause 24: An apparatus, comprising: a memory; and one or more processors coupled to the memory, the memory and the one or more processors being configured to perform a method in accordance with any one of Clauses 1-23.

Clause 25: An apparatus, comprising means for performing a method in accordance with any one of Clauses 1-23.

Clause 26: A non-transitory computer-readable medium comprising executable instructions that, when executed by one or more processors of an apparatus, cause the apparatus to perform a method in accordance with any one of Clauses 1-23.

ADDITIONAL CONSIDERATIONS

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
   receiving one or more configurations scheduling a communication with at least one base station (BS), wherein the one or more configurations schedule an uplink (UL) transmission and a downlink (DL) transmission such that the UL transmission and the DL transmission overlap in a time domain;
   determining whether to cancel at least a portion of the UL transmission based on one or more conditions associated with the UL transmission or the DL transmission, wherein the determination of whether to cancel at least the portion of the UL transmission is in response to the UL transmission and the DL transmission overlapping in the time domain;
   increasing a priority associated with the UL transmission each time at least a portion of the UL transmission is cancelled, wherein the determination of whether to cancel at least the portion of the UL transmission is further based on the priority exceeding a threshold; and
   performing the communication based on the determination.

2. The method of claim 1, wherein the UL transmission and the DL transmission are scheduled in a same frequency band.

3. The method of claim 1, wherein the UL transmission and the DL transmission overlap in a frequency domain and the time domain.

4. The method of claim 1, wherein the determining whether to cancel at least the portion of the UL transmission comprises determining to cancel an entirety of the UL transmission.

5. The method of claim 1, wherein the determining whether to cancel at least the portion of the UL transmission comprises determining to cancel the portion of the UL transmission overlapping in the time domain with the DL transmission.

6. The method of claim 1, wherein the determining whether to cancel at least the portion of the UL transmission comprises determining to cancel the portion of the UL transmission starting from an initial symbol overlapping in the time domain with the DL transmission till an end of the UL transmission.

7. The method of claim 1, wherein the determination is made by a physical (PHY) layer of the UE.

8. The method of claim 1, wherein the determination is made by a layer of the UE that is higher than a PHY layer of the UE.

9. The method of claim 8, wherein the layer that is higher than the PHY layer comprises a radio resource control (RRC) layer or a medium access control (MAC) layer.

10. The method of claim 1, wherein the one or more conditions comprise one or any combination of:
   a transmission power associated with the UL transmission;
   an expected level of self-interference power associated with the UL transmission;
   an allocation of the UL transmission in a frequency domain;
   a guard-band between the DL transmission and the UL transmission;
   an allocation of the DL transmission;
   a power associated with the DL transmission;
   a modulation and coding scheme (MCS) associated with the DL transmission; and
   a priority associated with the DL transmission.

11. The method of claim 1, further comprising:
   receiving a negative acknowledgment (NACK) indicating that the UL transmission was not decoded at the BS; and
   retransmitting the UL transmission in response to the reception of the NACK.

12. The method of claim 11, wherein the retransmission of the UL transmission is via half-duplex (HD) communication if the at least the portion of the UL transmission was cancelled.

13. The method of claim 1, further comprising transmitting an indication that at least the portion of the UL transmission was cancelled due to the UL transmission and the DL transmission overlapping in the time domain.

14. The method of claim 13, wherein the indication is transmitted via uplink control information (UCI).

15. The method of claim 13, further comprising receiving an allocation of resources for retransmitting the UL transmission using HD communication.

16. The method of claim 1, wherein the determination of whether to cancel at least the portion of the UL transmission depends, at least in part, on a type of the UL transmission.

17. The method of claim 16, wherein the determining whether to cancel at least the portion of the UL transmission comprises determining to forgo cancelling the UL transmission if the type of the UL transmission comprises one or more of:
   a physical random access channel (PRACH) transmission;
   a physical uplink control channel (PUCCH) transmission;
   a physical uplink shared channel (PUSCH) transmission;
   a retransmission of a PUSCH; or
   a sounding reference signal (SRS) transmission.

18. The method of claim 1, further comprising determining whether a priority of the UL transmission is less than a priority of the DL transmission based on a list of relative priorities associated with candidate UL and DL transmissions, wherein the UL transmission is cancelled if the priority of the UL transmission is less than the priority of the DL transmission.

19. A method for wireless communications by a user equipment (UE), comprising:
- receiving one or more configurations scheduling a communication with at least one base station (BS), wherein the one or more configurations schedule an uplink (UL) transmission and a downlink (DL) transmission such that the UL transmission and the DL transmission overlap in a time domain;
- determining whether to cancel at least a portion of the UL transmission based on one or more conditions associated with the UL transmission or the DL transmission, wherein the determination of whether to cancel at least the portion of the UL transmission is in response to the UL transmission and the DL transmission overlapping in the time domain;
- wherein the UL transmission is associated with a priority value, the priority value being incremented each time the UL transmission is cancelled, wherein the determination of whether to cancel at least the portion of the UL transmission is based on the priority value relative to a priority value of other candidate UL and DL transmissions; and
- performing the communication based on the determination.

20. The method of claim 19, wherein a step size associated with incrementing the priority value is dependent on a type of the UL transmission.

21. The method of claim 19, wherein the determination of whether to cancel at least the portion of the UL transmission is based on whether the priority value is greater than a threshold.

22. The method of claim 21, wherein the threshold is RRC configured.

23. An apparatus for wireless communications by a user equipment (UE), comprising:
- a memory; and
- one or more processors coupled to the memory, the one or more processors and the memory being configured to:
  - receive one or more configurations scheduling a communication with at least one base station (BS), wherein the one or more configurations schedule an uplink (UL) transmission and a downlink (DL) transmission such that the UL transmission and the DL transmission overlap in a time domain;
  - determine whether to cancel at least a portion of the UL transmission based on one or more conditions associated with the UL transmission or the DL transmission, wherein the determination of whether to cancel at least the portion of the UL transmission is in response to the UL transmission and the DL transmission overlapping in the time domain;
  - increase a priority associated with the UL transmission each time at least the portion of the UL transmission is cancelled, wherein the determination of whether to cancel at least the portion of the UL transmission is further based on the priority exceeding a threshold; and
  - perform the communication based on the determination.

24. The apparatus of claim 23, wherein the UL transmission and the DL transmission are scheduled in a same frequency band.

25. The apparatus of claim 23, wherein the UL transmission and the DL transmission overlap in a frequency domain and the time domain.

26. The apparatus of claim 23, wherein the determining whether to cancel at least the portion of the UL transmission comprises determining to cancel the portion of the UL transmission overlapping in the time domain with the DL transmission.

27. The apparatus of claim 23, wherein the determining whether to cancel at least the portion of the UL transmission comprises determining to cancel the portion of the UL transmission starting from an initial symbol overlapping in the time domain with the DL transmission till an end of the UL transmission.

28. An apparatus for wireless communications by a user equipment (UE), comprising:
- means for receiving one or more configurations scheduling a communication with at least one base station (BS), wherein the one or more configurations schedule an uplink (UL) transmission and a downlink (DL) transmission such that the UL transmission and the DL transmission overlap in a time domain;
- means for determining whether to cancel at least a portion of the UL transmission based on one or more conditions associated with the UL transmission or the DL transmission, wherein the determination of whether to cancel at least the portion of the UL transmission is in response to the UL transmission and the DL transmission overlapping in the time domain;
- means for increasing a priority associated with the UL transmission each time at least the portion of the UL transmission is cancelled, wherein the means for determining whether to cancel at least the portion of the UL transmission is further based on the priority exceeding a threshold; and
- means for performing the communication based on the determination.

29. A non-transitory computer-readable medium having instructions stored thereon to cause a user equipment (UE) to:
- receive one or more configurations scheduling a communication with at least one base station, wherein the one or more configurations schedule an uplink (UL) transmission and a downlink (DL) transmission such that the UL transmission and the DL transmission overlap in a time domain;
- determine whether to cancel at least a portion of the UL transmission based on one or more conditions associated with the UL transmission or the DL transmission, wherein the determination of whether to cancel at least the portion of the UL transmission is in response to the UL transmission and the DL transmission overlapping in the time domain;
- increase a priority associated with the UL transmission each time at least a portion of the UL transmission is cancelled, wherein the determination of whether to cancel at least the portion of the UL transmission is further based on the priority exceeding a threshold; and
- perform the communication based on the determination.

30. The method of claim 1, wherein increasing the priority associated with the UL transmission is based on a type of UL transmission.

31. The apparatus of claim 23, wherein the increase of the priority associated with the UL transmission is based on a type of UL transmission.

32. The apparatus of claim 28, wherein the means for increasing the priority associated with the UL transmission is based on a type of UL transmission.

* * * * *